(12) United States Patent
Koteyar et al.

(10) Patent No.: US 11,902,532 B2
(45) Date of Patent: Feb. 13, 2024

(54) VIDEO ENCODING OPTIMIZATION FOR MACHINE LEARNING CONTENT CATEGORIZATION

(71) Applicant: ATI Technologies ULC, Markham (CA)

(72) Inventors: Sunil Gopal Koteyar, Markham (CA); Mingkai Shao, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/488,944

(22) Filed: Sep. 29, 2021

(65) Prior Publication Data

US 2023/0095541 A1 Mar. 30, 2023

(51) Int. Cl.
| | |
|---|---|
| *H04N 19/139* | (2014.01) |
| *H04N 19/126* | (2014.01) |
| *G06N 20/00* | (2019.01) |
| *G06T 3/40* | (2006.01) |
| *H04N 19/55* | (2014.01) |
| *H04N 19/142* | (2014.01) |
| *G06V 20/40* | (2022.01) |

(52) U.S. Cl.
CPC ........... *H04N 19/139* (2014.11); *G06N 20/00* (2019.01); *G06T 3/40* (2013.01); *G06V 20/49* (2022.01); *H04N 19/126* (2014.11); *H04N 19/142* (2014.11); *H04N 19/55* (2014.11)

(58) Field of Classification Search
CPC .. H04N 19/139; H04N 19/126; H04N 19/142; H04N 19/55; G06N 20/00; G06T 3/40; G06V 20/49
See application file for complete search history.

(56) References Cited

U.S. PATENT DOCUMENTS

| | | | | |
|---|---|---|---|---|
| 10,659,787 | B1 * | 5/2020 | Brailovskiy | ........... H04N 19/13 |
| 2021/0067785 | A1 * | 3/2021 | Zhang | .................. H04N 19/159 |
| 2021/0160422 | A1 * | 5/2021 | Piacentino | ............. H04N 23/65 |
| 2021/0385443 | A1 * | 12/2021 | Masule | ................ H04N 19/114 |

OTHER PUBLICATIONS

Bendali-Braham et al., "Recent trends in crowd analysis: A review", Machine Learning with Applications 4, Jun. 15, 2021, 30 pages, vol. 4, Article 100023, Elsevier Ltd.

(Continued)

*Primary Examiner* — Richard T Torrente
(74) *Attorney, Agent, or Firm* — Kowert, Hood, Munyon, Rankin & Goetzel, P.C.; Rory D. Rankin

(57) ABSTRACT

Systems, apparatuses, and methods for performing machine learning content categorization leveraging video encoding pre-processing are disclosed. A system includes at least a motion vector unit and a machine learning (ML) engine. The motion vector unit pre-processes a frame to determine if there is temporal locality with previous frames. If the objects of the scene have not changed by a threshold amount, then the ML engine does not process the frame, saving computational resources that would typically be used. Otherwise, if there is a change of scene or other significant changes, then the ML engine is activated to process the frame. The ML engine can then generate a QP map and/or perform content categorization analysis on this frame and a subset of the other frames of the video sequence.

20 Claims, 7 Drawing Sheets

(56) References Cited

OTHER PUBLICATIONS

Maiya, Shishira R., "DeepSORT: Deep Learning to Track Custom Objects in a Video", Nanonets Automate Data Capture, 2019, 25 pages, Nano Net Technologies Inc., San Francisco, California.

Zeng et al., "Robust moving object segmentation on H.264/AVC compressed video using the block-based MRF model", Real-Time Imaging, Science Direct, Jun. 22, 2005, pp. 290-299, vol. 11, Elsevier Ltd.

Khan et al., "Research Article, An Efficient Algorithm for Recognition of Human Actions", The Scientific World Journal, Apr. 4, 2014, 11 Pages, vol. 2014, Article ID 875879, Hindawi Publishing Corporation, London, United Kingdom.

\* cited by examiner

VIDEO ENCODING OPTIMIZATION FOR MACHINE LEARNING CONTENT CATEGORIZATION

BACKGROUND

Description of the Related Art

Various applications perform encoding and decoding of images or video content. For example, video transcoding, desktop sharing, cloud gaming and gaming streaming are some of the applications which include support for encoding and decoding of content. One of the parameters that determines how content is encoded is the quantization parameter (QP). In various block-based video encoding schemes, such as those that comply with the H.264 standard, the QP regulates how much spatial detail is preserved during the encoding process. The QP selected for each video frame or each block of the frame is directly related to the size of the encoded video frame or size of the encoded block. The resultant block size is related to QP and is inversely proportional to QP. As used herein, the mapping of QP to blocks for a given frame is referred to as a "QP map". Selecting lower QP values will retain more spatial detail while yielding larger encoded sizes. Selecting higher QP values will cause more spatial detail to be lost while producing smaller encoded sizes. It is noted that the term "quantization parameter" can also be referred to more generally as "quantization strength".

One prevalent trend in video compression is to use machine learning (ML) algorithms to categorize content or detect particular features in the video. Having detected those features in the video, the bits can be allocated in such a way as to improve the resultant visual quality. Many platforms do not have inference acceleration support, and without dedicated inference support, traditional ML models are typically too computationally expensive to execute in real-time.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing machine learning content categorization leveraging video encoding pre-processing are disclosed herein. In one implementation, a system includes at least a motion vector unit and a machine learning (ML) engine. The motion vector unit pre-processes a frame to determine if there is temporal locality with previous frames. If the objects of the scene have not changed by a threshold amount, then the ML engine does not process the frame, saving computational resources that would typically be used. Otherwise, if there is a change of scene or other significant changes, then the ML engine is activated to process the frame. The ML engine can then generate a QP map and/or perform content categorization analysis on this frame and a subset of the other frames of the video sequence.

Figure 1:
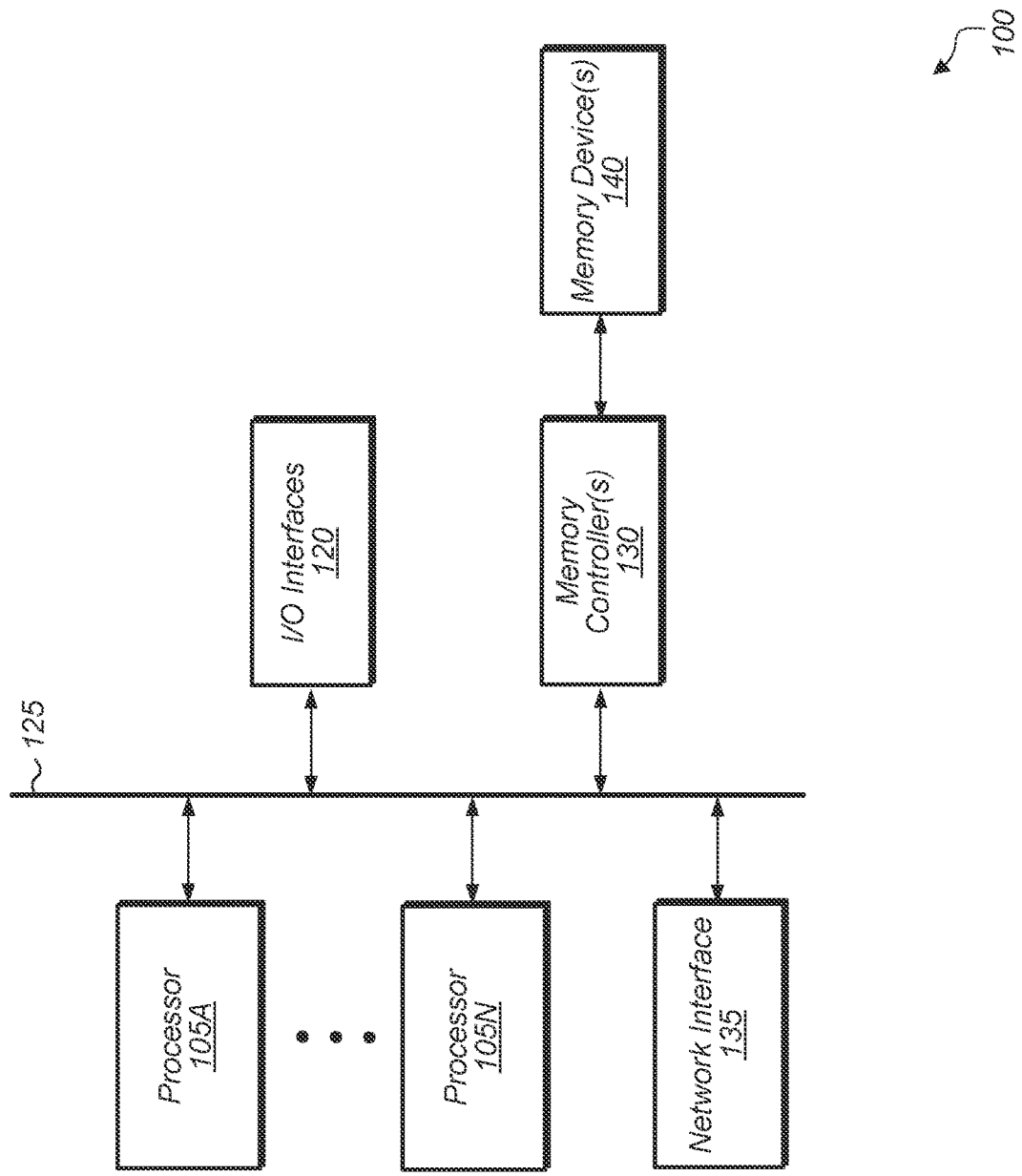
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, one or more of processors 105A-N implements an encoder to encode an image or video frame. In various implementations, the encoded bitstream generated by the encoder is stored in memory device(s) 140, conveyed to a separate module for network transmission, processed by a separate module, sent to a decoder to be displayed, and/or provided to other types of modules which perform other types of operations.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express)

bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
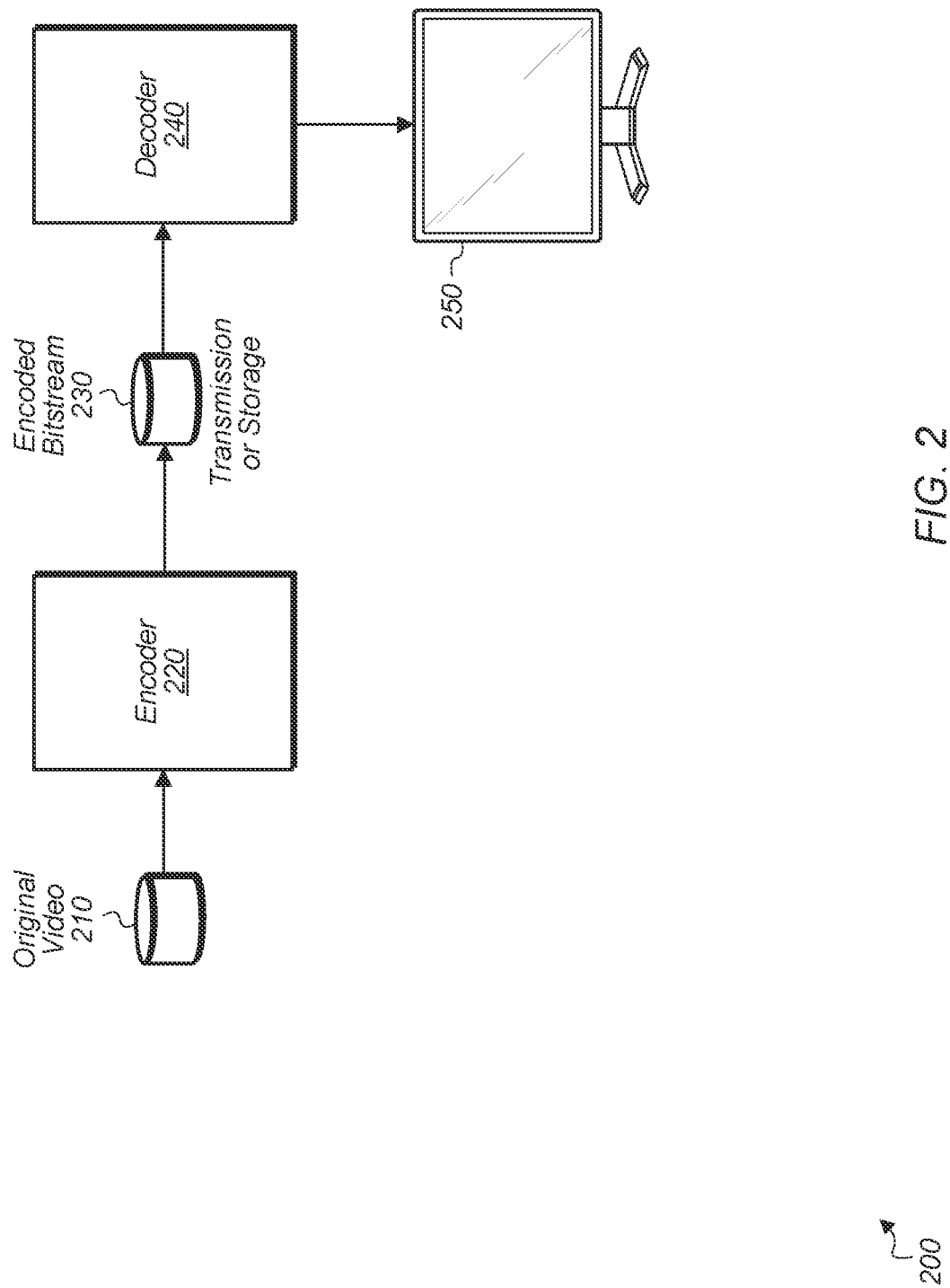
FIG. 2 is a block diagram of one implementation of a system for encoding and decoding a video stream.

Turning now to FIG. 2, a block diagram of one implementation of a system 200 for encoding and decoding a video stream is shown. In one implementation, encoder 220 and decoder 240 are part of the same system 200. In another implementation, encoder 220 and decoder 240 are part of separate systems. In one implementation, encoder 220 includes circuitry to compress original video 210 into encoded bitstream 230. Decoder 240 includes circuitry to decode encoded bitstream 230 and then drive the decoded bitstream to display 250. In another implementation, encoder 220 compresses an image frame rather than a video stream and decoder 240 decodes and drives the image frame to display 250.

In one implementation, the pixels of the frames of original video 210 include three color channels. For example, in one implementation, the pixels of the frames of original video 210 are encoded in the red-green-blue (RGB) color space. In other implementations, the pixels of the frames of original video 210 are stored in other formats (e.g., YCbCr, YUV, ARGB) and/or with other numbers of color component channels.

Depending on the implementation, encoder 220 and decoder 240 are each implemented using any suitable combination of circuitry and/or processing units executing program instructions. For example, encoder 220 is implemented in a computing system that includes one or more of a central processing unit (CPU), graphics processing unit (GPU), digital signal processor (DSP), field programmable gate array (FPGA), application specific integrated circuit (ASIC), or any other suitable hardware devices. In some cases, the hardware device(s) that include processing elements are coupled to one or more memory devices which include program instructions executable by the processing elements. Similarly, decoder 240 is implemented using any combination of hardware and/or software.

As shown in FIG. 2, encoder 220 converts original video 210 into encoded bitstream 230. In one implementation, encoded bitstream 230 is formatted according to the high efficiency video coding (HEVC) standard. In another implementation, the encoded bitstream 230 is formatted to be compatible with the advanced video coding (AVC) standard. In other implementations, the encoded bitstream 230 is formatted according to other video coding standards.

Figure 3:
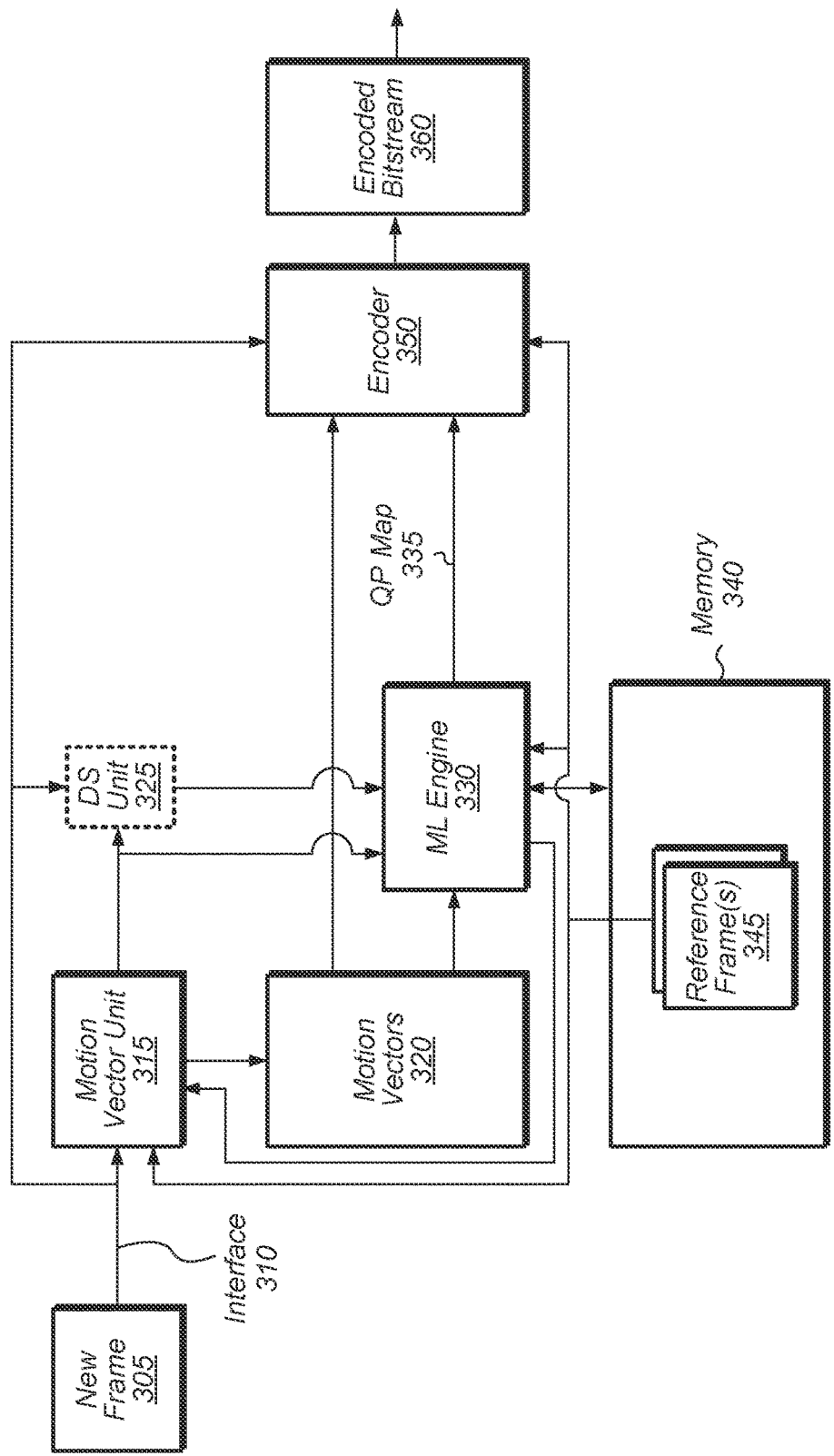
FIG. 3 is a block diagram of one implementation of an apparatus for encoding frames of a video.

Referring now to FIG. 3, a block diagram of one implementation of an apparatus 300 for encoding frames of a video is shown. A new frame 305 of a video is received by apparatus 300 on interface 310 and coupled to motion vector unit 315, machine learning (ML) engine 330, optional downscaling (DS) unit 325, and encoder 350. Depending on the implementation, interface 310 is a bus interface, a memory interface, or an interconnect to a communication fabric and/or other type(s) of device(s). Each of motion vector unit 315, ML engine 330, and encoder 350 is implemented using any suitable combination of hardware and/or software.

In one implementation, motion vector unit 315 generates motion vectors 320 for the blocks of new frame 305 based on a comparison of new frame 305 to a given reference frame 345. Motion vectors 320 specify the temporal correlation between new frame 305 and the given reference frame 345, with each individual motion vector providing the displacement of a corresponding block. It is noted that motion vector unit 315 can also be referred to as motion estimation unit 315. Depending on the implementation, any number of reference frame(s) 345 are stored in memory 340. Memory 340 is representative of any number and type of memory or cache device(s) for storing data and/or instructions associated with the encoding process.

Motion vectors 320 are provided to ML engine 330 and encoder 350. ML engine 330 determines whether to analyze new frame 305 based on motion vectors 320 and based on indication(s) provided by motion vector unit 315. For example, in one implementation, ML engine 330 determines whether to process new frame 305 based on the pre-processing performed by motion vector unit 315 on new frame 305. In this implementation, ML engine 330 only processes a subset of frames of a video sequence, such as frames with new objects or frames that include a new scene. Motion vector unit 315 preprocesses new frame 305 (and subsequent frames) and provides per-frame indications to ML engine 330. In one implementation, the per-frame indications specify whether ML engine 330 should process the given frame. Also, in one implementation, motion vector unit 315 activates optional downscaling unit 325 to downscale new frame 305 to provide a downscaled version of new frame 305 to ML engine 330 to reduce the computational power required to process the frame.

One of the parameters determining how video content is encoded is the quantization parameter (QP). Quantization is the mechanism used in video standards (e.g., high efficiency video coding (HEVC) standard, advanced video coding. In various block-based video encoding schemes, such as those that comply with the H.264 standard, the QP regulates how much detail is preserved during the encoding process. The QP selected for each video frame or each block of the frame is directly related to the size of the encoded video frame or size of the encoded block. Selecting lower QP values will retain more detail while yielding larger encoded sizes. Selecting higher QP values will cause more detail to be lost while producing smaller encoded sizes.

In one implementation, when ML engine 330 processes a given frame, ML engine 330 generates and conveys QP map 335 to encoder 350 which is used by encoder 350 to encode the given frame to generate encoded bitstream 360. ML engine 330 also provides feedback to motion vector unit 315 to assist with the functions performed by motion vector unit 315. In other implementations, ML engine 330 provides other types of data to encoder 350 to assist encoder 350 in encoding frames. In some implementations, ML engine 330 processes only a portion of a given frame based on the indications received from motion vector unit 315. For example, in one implementation, a given frame is partitioned into portions and motion vector unit 315 notifies ML engine which of the portions should be processed.

In one implementation, apparatus 300 attempts to generate encoded bitstream 360 with a consistent bit-rate. It can be challenging to control the bit-rate of an encoded video stream while also providing an acceptable picture quality. In one implementation, the preferred bitcount of each video frame is equal to the bit-rate of the encoded video stream divided by the frame-rate of the video sequence. It is noted that the term "bitcount" is used interchangeably herein with the term "bit-size". In one implementation, encoder 350 adjusts the QP used to encode the input video sequence, based on QP map 335, to control the bitcount of each frame of encoded bitstream 360.

In one implementation, encoder 350 determines which QP to select for the input video frame so as to meet a desired bit-size for the resulting encoded frame. In one implementation, the desired bit-size for each encoded frame is determined based on a desired bit-rate of encoded bitstream 360. For example, in one implementation, the desired bit-rate is specified in bits per second (e.g., 3 megabits per second (Mbps)) and the frame rate of the video sequence is specified in frames per second (fps) (e.g., 60 fps, 24 fps). In this implementation, encoder 350 divides the desired bit-rate by the frame rate to calculate a desired bit-size for each encoded frame. It is noted that in other implementations, apparatus 300 includes other components and/or is arranged in other suitable manners than is shown in FIG. 3.

Figure 4:
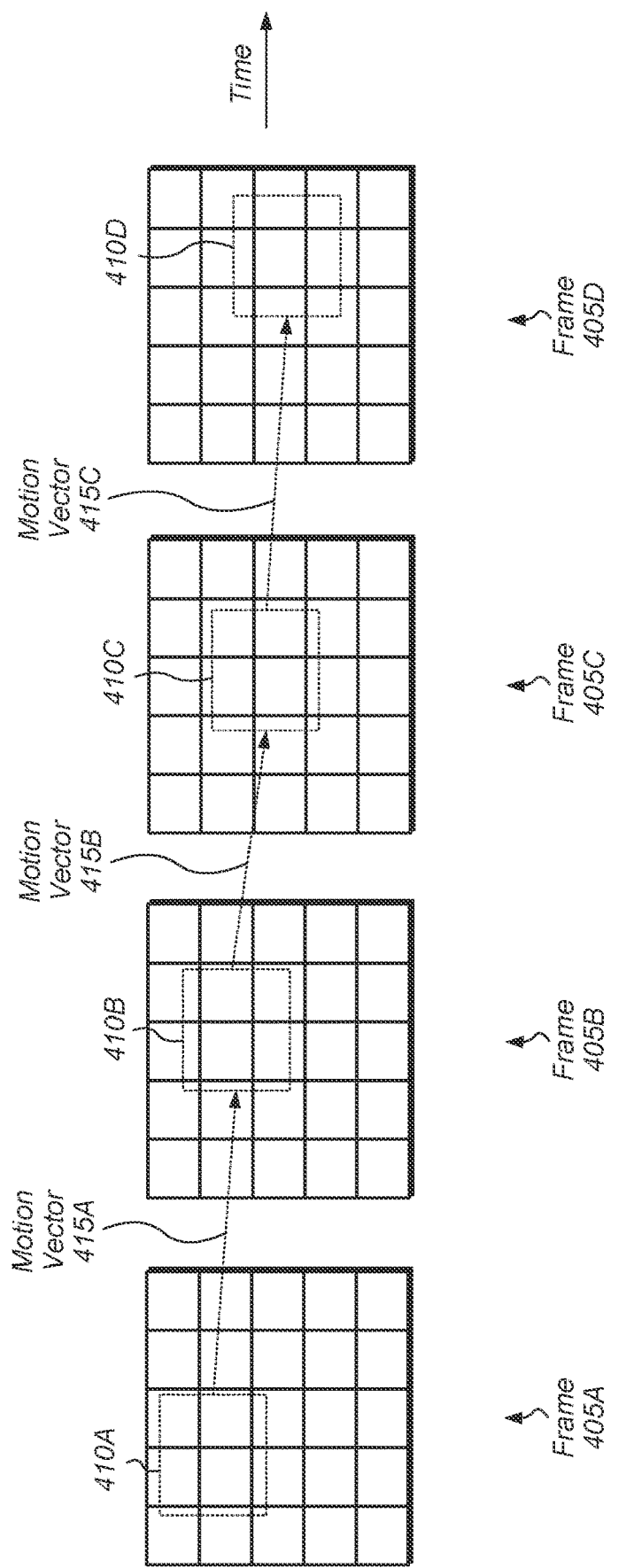
FIG. 4 is a diagram of one implementation of a set of motion vectors for a sequence of video frames.

Turning now to FIG. 4, a diagram of one implementation of a set of motion vectors 415A-C for a sequence of video frames 405A-D is shown. Frames 405A-D represent consecutive frames of a video sequence. Box 410A represents an individual block of pixels within frame 405A. Box 410A can also be referred to as a macroblock. The arrow 415A represents the known motion of the imagery within box 410A as the video sequence moves from frame 405A to 405B. The known motion illustrated by arrow 415A can be defined by a motion vector. It is noted that although motion vectors 415A-C point in the direction of motion of box 410 in subsequent frames, in another implementation, a motion vector can be defined to point in a direction opposite to the motion of the imagery. For example, in some compression standards, a motion vector associated with a macroblock points to the source of that block in the reference frame. The reference frame can be forward or backward in time. It is also noted that motion vectors can represent, more generally, entropy in some implementations.

In one implementation, boxes 410B-D can be tracked in subsequent frames using motion vectors 415A-C. For example, the motion vector 415A indicates the change in position of box 410B in frame 405B as compared to box 410A in frame 405A. Similarly, motion vector 415B indicates the change in location of box 410C in frame 410C as compared to box 410B in frame 405B. Also, motion vector 415C indicates the change in location of box 410D in frame 410D as compared to box 410C in frame 405C. In another implementation, a motion vector is defined to track the reverse motion of a block from a given frame back to the previous frame.

In one implementation, when a system or apparatus is determining whether to activate (i.e., enable) a ML engine (e.g., ML engine 330 of FIG. 3) to process a given frame, the system/apparatus uses the output(s) from a motion vector unit (e.g., motion vector unit 315) to influence this decision. For example, in one implementation, if the motion vector unit determines, based on preprocessing the given frame, that the given frame has one or more new objects or a change of scene has been detected, then the system/apparatus activates the ML engine to process the given frame. In response, the ML engine performs analysis of the given frame according to any of various ML models. This analysis allows the ML engine to generate outputs which inform the encoding process performed by an encoder (e.g., encoder 350). For example, in one implementation, the ML engine generates a QP map for the encoder to assist the encoder in assigning bits to various blocks of the given frame. In other implementations, the ML engine generates other data to assist the encoder with the encoding process.

Figure 5:
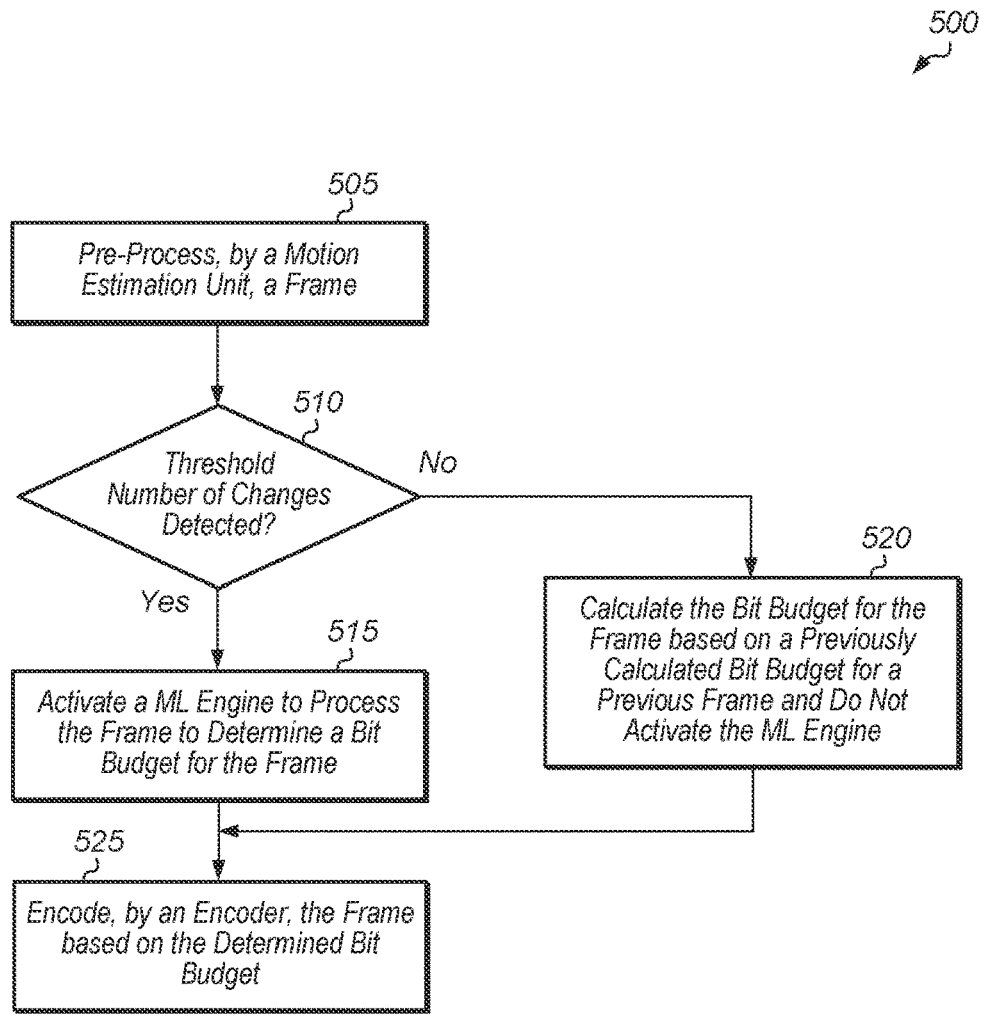
FIG. 5 is a generalized flow diagram illustrating one implementation of a method for activating a ML engine for analyzing a subset of frames.
Figure 6:
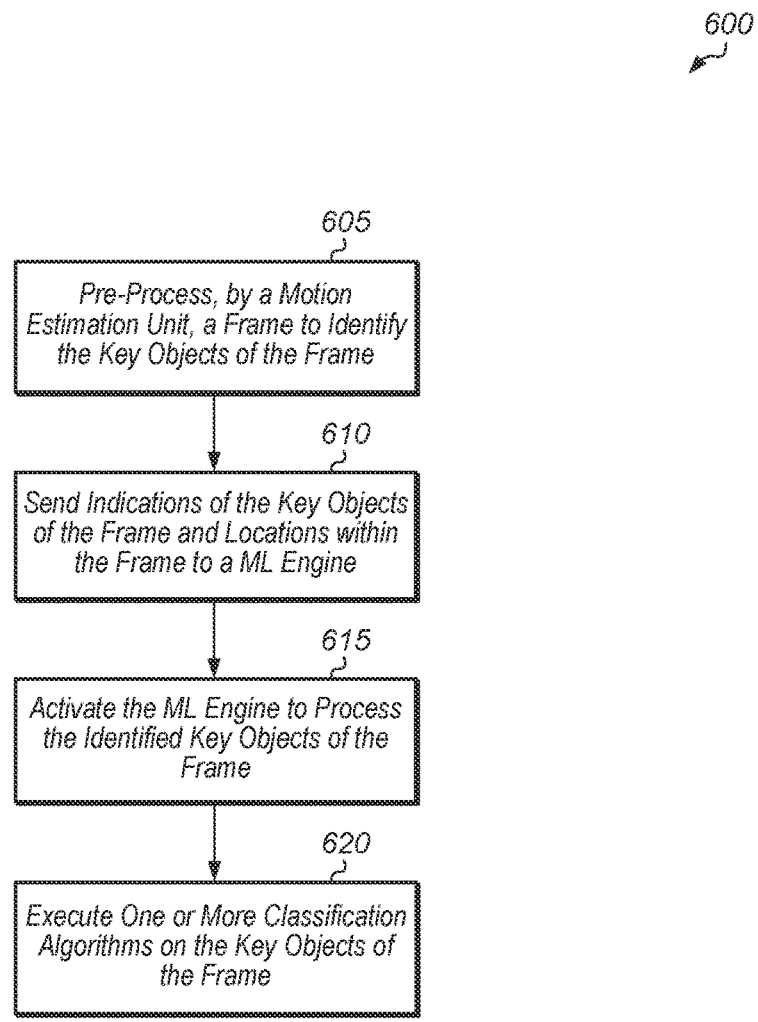
FIG. 6 is a generalized flow diagram illustrating one implementation of a method for performing classification algorithms by a ML engine acting in cooperation with a motion estimation unit.
Figure 7:
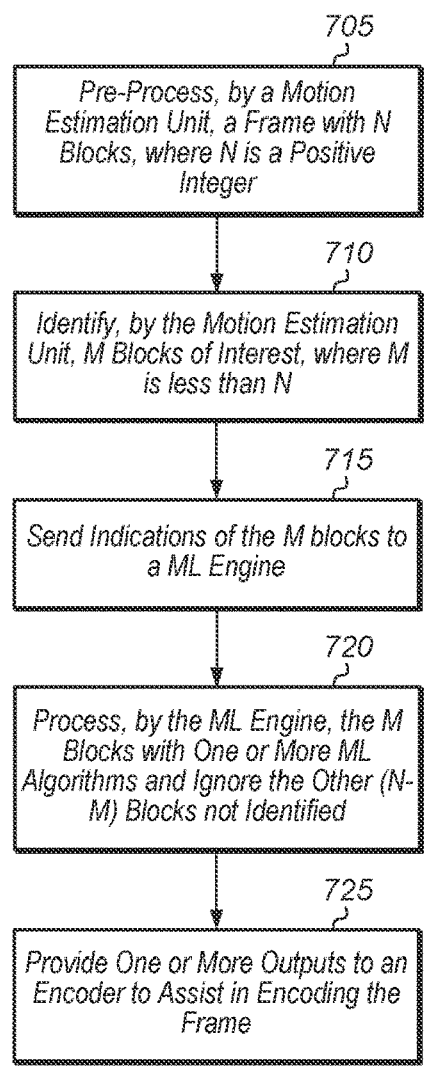
FIG. 7 is a generalized flow diagram illustrating one implementation of a method for a ML engine processing a subset of blocks of a frame.

Referring now to FIG. 5, one implementation of a method 500 for activating a ML engine for analyzing a subset of frames is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500 (and methods 600-700).

A motion estimation unit (e.g., motion vector unit 315 of FIG. 3) pre-processes a frame (block 505). If a threshold number of changes are detected in the frame (conditional block 510, "yes" leg), then a ML engine (e.g., ML engine 330) is activated to process the frame to determine a bit budget for the frame (block 515). The value of the threshold can vary from implementation to implementation. Otherwise, if less than the threshold number of changes are detected (conditional block 510, "no" leg), then the bit budget for the frame is calculated based on a previously calculated bit budget used for a previous frame and the ML engine is not activated (block 520). In this case, activating the ML engine is not deemed to be worth the increase in computational power that would be expended since fewer than the threshold number of changes have been detected in the frame.

After blocks 515 and 520, an encoder encodes the frame based on the determined bit budget (block 525). After block 525, method 500 ends. It is noted that method 500 can be performed for each frame of a video sequence. It is also noted that the threshold used in conditional block 510 can be adjusted based on operating conditions. For example, if the host system or apparatus is in a low power mode, the threshold can be increased to reduce the number of times the ML engine is activated.

Turning now to FIG. 6, one implementation of a method 600 for performing classification algorithms by a ML engine acting in cooperation with a motion estimation unit is shown. A motion estimation unit (e.g., motion vector unit 315 of FIG. 3) pre-processes a frame to identify the key objects (i.e., the most prominent objects) of the frame (block 605). The motion estimation unit sends indications of the key objects of the frame and locations within the frame to a ML engine (e.g., ML engine 330) (block 610). The ML engine is activated to process the identified key objects of the frame (block 615). The ML engine executes one or more classification algorithms on the key objects of the frame (block 620). After block 620, method 600 ends. It is noted that method 600 can be repeated for subsequent frames of a video sequence.

Referring now to FIG. 7, one implementation of a method 700 for a ML engine processing a subset of blocks of a frame is shown. A motion estimation unit (e.g., motion vector unit 315 of FIG. 3) pre-processes a frame with N blocks, where N is a positive integer (block 705). The value of N can vary from implementation to implementation. It is noted that the N blocks can also be referred to more generally as portions of the frame. The motion estimation unit identifies M blocks of interest, where M is less than N (block 710). Next, the motion estimation unit sends indications of the M blocks to an ML engine (e.g., ML engine 330) (block 715). Then, the ML engine processes the M blocks with one or more ML algorithms and ignores the other (N-M) blocks not identified (block 720). Depending on the implementation, the ML algorithms are used for content analysis, classification purposes, generation of adaptive QP maps, and/or applying other types of ML models. Next, the ML engine provides one or more outputs (e.g., adaptive QP map) to an encoder to assist in encoding the frame (block 725). After block 725, method 700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (ML) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a motion estimation unit comprising circuitry configured to:
      preprocess an input frame; and
      generate an indication, based at least in part on a comparison of the input frame to a previous frame; and
   machine learning (ML) engine circuitry configured to:
      responsive to the indication meeting a condition:
         process the input frame; and
         provide one or more outputs of the ML engine circuitry to an encoder for encoding the input frame; and
      responsive to the indication not meeting the condition, prevent processing of the input frame by the ML engine circuitry.

2. The apparatus as recited in claim 1, wherein the motion estimation unit is further configured to identify one or more objects in the input frame, and wherein the ML engine circuitry is further configured to process only the one or more objects identified by the motion estimation unit, responsive to the indication meeting the condition.

3. The apparatus as recited in claim 1, wherein:
   responsive to the indication meeting a condition, the input frame is processed by the ML engine circuitry to determine a bit budget for the input frame; and
   responsive to the indication not meeting the condition, the bit budget for the frame is calculated based on a bit budget of a previous frame.

4. The apparatus as recited in claim 1, wherein the one or more outputs provided to the encoder comprise a quantization parameter (QP) map.

5. The apparatus as recited in claim 1, wherein the indication comprises one or more motion vectors.

6. The apparatus as recited in claim 3, wherein the condition comprises the indication indicating the input frame has a threshold number of changes compared to the previous frame.

7. The apparatus as recited in claim 1, wherein the ML engine is further configured to process a subset of objects in the input frame, wherein the subset of objects are identified by the motion estimation unit.

8. A method comprising:
   preprocessing, by a motion estimation unit comprising circuitry, an input frame;
   generating an indication, by the motion estimation unit, based at least in part on a comparison of the input frame to a previous frame;
   responsive to the indication meeting a condition:
      processing, by a machine learning (ML) engine comprising circuitry, the input frame; and
      providing one or more outputs of the ML engine to an encoder for encoding the input frame; and
   responsive to the indication not meeting the condition, preventing processing of the input frame by the ML engine.

9. The method as recited in claim 8, wherein responsive to the indication meeting the condition, the method further comprises:
   identifying, by the motion estimation unit, one or more objects in the input frame; and
   processing, by the machine learning engine, only the one or more objects identified by the motion estimation unit.

10. The method as recited in claim 8, further comprising responsive to the indication meeting a condition, processing the input frame by the ML engine to determine a bit budget for the input frame; and
responsive to the indication not meeting the condition, determining the bit budget for the input frame based on a bit budget of a previous frame.

11. The method as recited in claim 8, wherein the one or more outputs provided to the encoder comprise a quantization parameter (QP) map.

12. The method as recited in claim 8, wherein the indication comprises one or more motion vectors.

13. The method as recited in claim 10, wherein the condition comprises the indication indicating the input frame has a threshold number of changes compared to the previous frame.

14. The method as recited in claim 8, further comprising processing a subset of objects in the input frame, wherein the subset of objects are identified by the motion estimation unit.

15. A system comprising:
   a memory storing at least a portion of an input frame; and
   a processor comprising circuitry configured to:
      preprocess an input frame; and
      generate an indication, based at least in part on a comparison of the input frame to a previous frame;

responsive to the indication meeting a condition:
  process the input frame; and
    provide one or more outputs of the ML engine circuitry to an encoder for encoding the input frame; and
  responsive to the indication not meeting the condition, prevent processing of the input frame by the ML engine circuitry.

16. The system as recited in claim 15, wherein the processor is further configured to:
identify, during preprocessing, one or more objects in the input frame; and
process, by the machine learning engine circuitry, only the one or more objects identified by a motion estimation unit.

17. The system as recited in claim 16, wherein:
responsive to the indication meeting a condition, the input frame is processed by the ML engine circuitry to determine a bit budget for the input frame; and
responsive to the indication not meeting the condition, the bit budget for the frame is calculated based on a bit budget of a previous frame.

18. The system as recited in claim 15, wherein the one or more outputs provided to the encoder comprise a quantization parameter (QP) map.

19. The system as recited in claim 15, wherein the indication comprises one or more motion vectors.

20. The system as recited in claim 19, wherein the processor is further configured to process a downscaled version of the input frame by the ML engine circuitry.

* * * * *